UNITED STATES PATENT OFFICE.

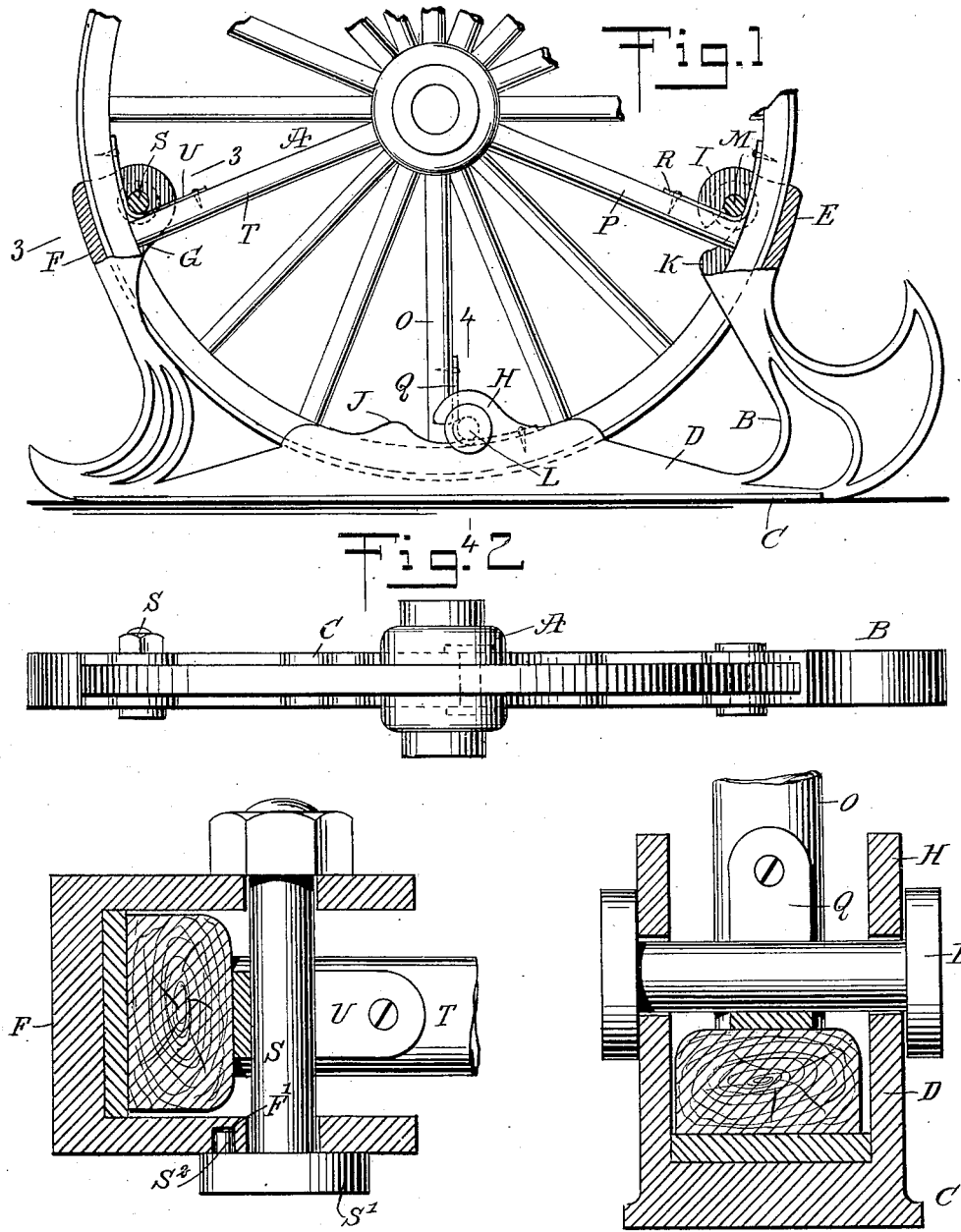

JOHN KARSSEN, OF HOLLAND, MICHIGAN.

VEHICLE-WHEEL SLED-RUNNER.

No. 910,206.

Specification of Letters Patent.

Patented Jan. 19, 1909.

Application filed June 8, 1908. Serial No. 437,316.

*To all whom it may concern:*

Be it known that I, JOHN KARSSEN, a citizen of the United States, and a resident of Holland, in the county of Ottawa and State of Michigan, have invented certain new and useful Improvements in Vehicle-Wheel Sled-Runners, of which the following is a full, clear, and exact description.

My improvement relates to that type of vehicle-wheel-sled-runner adapted to be secured to the tire of the wheel to which it is applied and wherein the wheel is gripped laterally by the runner-supports while the wheel-tire is carried thereby; and the object of my invention is to provide a simple and inexpensive sled-runner, which may be applied to a vehicle-wheel with facility and which possesses durability in its structure, all of which I accomplish by the construction disclosed in the accompanying drawings forming part of this specification, in which—

Figure 1 is a partial side elevational view of my improved runner as applied to the tire of a wheel; Fig. 2 is a top plan view of the same; Fig. 3 is an enlarged fragmentary cross-sectional view taken through the tire-rim and sled-frame, on the line 3—3 of Fig. 1, and Fig. 4 is a like view, the section being taken vertically through the line 4—4 of Fig. 1.

In the several views similar characters of reference designate like parts.

A is a wheel, to which is secured my improved sled-runner B. The latter consists of a shoe C of any material suitable for the purpose, and a framing D of channel cross-sectional formation, the walls of the channel being positioned vertically for the reception between them of the tire and rim of the wheel A. The toe and heel of the runner B are likewise provided respectively with channel-frames E and F. These are shaped to fit and seat the tire of the wheel A and are provided with integral lateral securing lugs G, H and I, respectively. The lugs H and I are provided respectively with entrance cams J and K, with which engage respectively cylindrical headed pins L and M. These are transversely secured to spokes O and P respectively and to the adjacent portions of the rim of the wheel A, by means of eye-straps Q and R, and screws or other well-known fastenings. The lugs G are perforated for the reception of a bolt S, between which and the channel-frame F the tire of the wheel A is secured, and to this end the spoke T is provided with an eye-strap U, which is secured to both the wheel tire rim and the spoke by screws, or other suitable fastening devices. In order to prevent the bolt S from turning, its head S' is provided with a pin or projection $S^2$ which seats in a recess F' formed in the channel-frame F, as shown in Fig. 3.

To apply the rim B to the wheel A, the bolt S is removed and the wheel A is positioned on the runner B, with the pins L and M resting on the portions E and D of the frame at the entrances to the cams J and K respectively. The wheel is then partially rotated to the left until the eye in the strap U registers with the perforation in the lug G, whereupon the spokes T, O and P will move to the right and the pins L and M are then driven in past the respective cams J and K, and thus draw the runner B tightly upon the rim of the wheel A. Now upon introducing the bolt S into the perforation of the lug G and the eye of the bracket U alined therewith and setting it up firmly, with the pin or projection $S^2$ seated in the recess F' in the channel-frame F, the runner B will be secured to the wheel A at three points, while the bolt S serves the purpose of a lock for additional security.

It will be noted that the arrangement of the spokes P and T and their fastening devices relatively to the spoke O and its fastening device, is such that they reinforce each other and assure a firm and steady connection of the wheels A with the runners B.

Having thus described my invention, I claim as new and desire to secure by Letters Patent:

1. In a vehicle sled runner, a frame for engaging a wheel rim, having entrant cams, headed pins fixedly secured to the wheel and engaging the said cams, and means for locking the frame to the wheel.

2. The combination of a vehicle-wheel, a sled-runner, locking members carried by the former and co-acting with the latter, and a single fastening engaging both the runner and wheel, and adapted to control the locking members.

3. In a vehicle-wheel-sled-runner, and in combination with the wheel thereof, a plurality of peripheral transversely-disposed pins, cams carried by the runner and adapted to engage with the pins upon the rotation of the wheel, and to secure the runner to the wheel, and a single fastening between the wheel and runner, to restrict the relative movement between the wheel and runner, and to maintain the engagement of the cams and pins.

4. The combination with a vehicle-wheel and a sled-runner carried thereby, of lateral fastening devices carried by the wheel at peripheral intervals, coöperative cam-lugs carried by the runner and adapted to engage and clamp the wheel to the runner upon the rotation of the wheel, and a lock engaging the wheel and runner, adapted to restrain the rotation of the wheel and maintain the engagement of the connecting lugs and lateral fastening devices, substantially as described.

5. A sled runner for wheels, comprising a frame for engaging a wheel at intervals and provided with lugs at the points of engagement, two of the lugs being hooked-shaped, pins carried by the wheel and engaging the said hooked-shaped lugs, and a bolt engaging the other lug and an eye carried by the wheel.

In testimony whereof I have signed my name to this specification in the presence of two subscribing witnesses.

JOHN KARSSEN.

Witnesses:
ANTHONY A. NIENHUIS,
HENRY REIDSEWA.